US012478103B2

(12) United States Patent
Gill

(10) Patent No.: US 12,478,103 B2
(45) Date of Patent: Nov. 25, 2025

(54) INDUCTION HEATING ASSEMBLY FOR AN AEROSOL GENERATING DEVICE AND A METHOD OF MANUFACTURING THE SAME

(71) Applicant: JT International S.A., Geneva (CH)

(72) Inventor: Mark Gill, London (GB)

(73) Assignee: JT International SA (CH)

( * ) Notice: Subject to any disclaimer, the term of this patent is extended or adjusted under 35 U.S.C. 154(b) by 993 days.

(21) Appl. No.: 17/282,906

(22) PCT Filed: Nov. 21, 2019

(86) PCT No.: PCT/EP2019/082038
§ 371 (c)(1),
(2) Date: Apr. 5, 2021

(87) PCT Pub. No.: WO2020/109123
PCT Pub. Date: Jun. 4, 2020

(65) Prior Publication Data

US 2021/0386120 A1 Dec. 16, 2021

(30) Foreign Application Priority Data

Nov. 26, 2018 (EP) .................................... 18208283

(51) Int. Cl.
*A24F 40/465* (2020.01)
*A24F 40/20* (2020.01)
(Continued)

(52) U.S. Cl.
CPC ............ *A24F 40/465* (2020.01); *A24F 40/20* (2020.01); *A24F 40/70* (2020.01); *H05B 6/105* (2013.01); *H05B 6/36* (2013.01)

(58) Field of Classification Search
CPC ........ A24F 40/465; A24F 40/20; A24F 40/70; H05B 6/105; H05B 6/36; H05B 6/106; H05B 6/362; H05B 6/10
See application file for complete search history.

(56) References Cited

U.S. PATENT DOCUMENTS 5,613,505 A * 3/1997 Campbell .............. H05B 6/365 131/194
2004/0149297 A1 8/2004 Sharpe
(Continued)

FOREIGN PATENT DOCUMENTS

EP 3295813 A1 3/2018
JP 2009164012 A * 7/2009
(Continued)

OTHER PUBLICATIONS

"Slot" definition, Merriam-Webster dictionary, p. 1 (Year: 2009).*
(Continued)

*Primary Examiner* — Tiffany T Tran
(74) *Attorney, Agent, or Firm* — Lerner David LLP

(57) ABSTRACT

An induction heating assembly for an aerosol generating device includes a heating chamber for receiving, in use, an aerosol generating article, and an induction coil assembly. The induction coil assembly substantially surrounds the heating chamber and includes an electrically insulating layer and an electrically conductive track. The induction coil assembly has a substantially tubular construction and at least part of the induction coil assembly overlaps with another part of the induction coil assembly in an axial direction.

13 Claims, 11 Drawing Sheets

(51) Int. Cl.

| | |
|---|---|
| ***A24F 40/70*** | (2020.01) |
| ***H05B 6/10*** | (2006.01) |
| ***H05B 6/36*** | (2006.01) |

(56) References Cited

U.S. PATENT DOCUMENTS

| | | | | |
|---|---|---|---|---|
| 2004/0149737 | A1 | 8/2004 | Sharpe et al. | |
| 2017/0055583 | A1* | 3/2017 | Blandino | A24D 1/20 |
| 2017/0079326 | A1* | 3/2017 | Mironov | H05B 6/108 |
| 2019/0182909 | A1* | 6/2019 | Fursa | A24F 40/465 |
| 2021/0137167 | A1* | 5/2021 | Aoun | A24F 40/465 |

FOREIGN PATENT DOCUMENTS

| | | | |
|---|---|---|---|
| WO | 9527411 | A1 | 10/1995 |
| WO | 2017072146 | A1 | 5/2017 |
| WO | 2018041450 | A1 | 3/2018 |
| WO | 2018178095 | A1 | 10/2018 |

OTHER PUBLICATIONS

International Search Report for Application No. PCT/EP2019/082038, dated Feb. 19, 2020, 4 pages.

* cited by examiner

INDUCTION HEATING ASSEMBLY FOR AN AEROSOL GENERATING DEVICE AND A METHOD OF MANUFACTURING THE SAME

CROSS-REFERENCE TO RELATED APPLICATIONS

The present application is a national phase entry under 35 U.S.C. § 371 of International Application No. PCT/EP2019/082038, filed Nov. 21, 2019, published in English, which claims priority to European Application No. 18208283.4 filed Nov. 26, 2018, the disclosures of which are incorporated herein by reference.

TECHNICAL FIELD

The present disclosure relates generally to an induction heating assembly for an aerosol generating device, and in particular to an induction heating assembly that may be used to heat an aerosol generating article that generates aerosol for inhalation by a user.

Embodiments of the present disclosure also relate to an aerosol generating device incorporating the induction heating assembly and a method of manufacturing an induction heating assembly.

TECHNICAL BACKGROUND

Devices which heat, rather than burn, an aerosol forming material to produce an aerosol for inhalation have become popular with consumers in recent years.

Such devices may use one of a number of different approaches to provide heat to the aerosol forming material. One such approach is to provide an aerosol generating device which employs an induction heating system and into which an aerosol generating article, comprising aerosol forming material, may be removably inserted by a user. In such a device, an induction coil is provided with the device and an induction heatable susceptor is also provided. Electrical energy is provided to the induction coil when a user activates the device which in turn generates an alternating electromagnetic field. The susceptor couples with the electromagnetic field and generates heat which is transferred, for example by conduction, to the aerosol forming material and an aerosol is generated as the aerosol forming material is heated but not burnt.

SUMMARY OF THE DISCLOSURE

According to a first aspect of the present disclosure there is provided an induction heating assembly for an aerosol generating device, the induction heating assembly comprising a heating chamber for receiving, in use, an aerosol generating article, and an induction coil assembly substantially surrounding the heating chamber, the induction coil assembly comprising an electrically insulating layer and an electrically conductive track, wherein the induction coil assembly has a substantially tubular construction and wherein at least part of the induction coil assembly overlaps with another part of the induction coil assembly in an axial direction. The axial direction is the axial direction of the induction coil assembly.

The heating chamber of the induction heating assembly is adapted to receive, in use, an aerosol generating article. The electrically conductive track defines an induction coil generating an alternating electromagnetic field for heating one or more susceptors in the aerosol generating article by inducing eddy current and/or magnetic hysteresis losses in the susceptor(s). The susceptor(s) may comprise one or more, but not limited, of aluminium, iron, nickel, stainless steel and alloys thereof, e.g. Nickel Chromium or Nickel Copper.

The aerosol generating article may comprise an aerosol forming material. The induction heating assembly is adapted to heat the aerosol forming material, without burning the aerosol forming material, to volatise at least one component of the aerosol forming material and thereby generate an aerosol for inhalation by a user of the aerosol generating device.

In general terms, a vapour is a substance in the gas phase at a temperature lower than its critical temperature, which means that the vapour can be condensed to a liquid by increasing its pressure without reducing the temperature, whereas an aerosol is a suspension of fine solid particles or liquid droplets, in air or another gas. It should, however, be noted that the terms ‘aerosol’ and ‘vapour’ may be used interchangeably in this specification, particularly with regard to the form of the inhalable medium that is generated for inhalation by a user.

The aerosol generating article may comprise a body of aerosol forming material. The aerosol forming material may be any type of solid or semi-solid material. Example types of solid or semi-solid material include powder, granules, pellets, shreds, strands, particles, gel, strips, loose leaves, cut filler, porous material, foam material or sheets.

The aerosol forming material may comprise plant derived material and in particular tobacco.

The aerosol forming material may comprise an aerosol-former. Examples of aerosol-formers include polyhydric alcohols and mixtures thereof such as glycerine or propylene glycol. Typically, the aerosol forming material may comprise an aerosol-former content of between approximately 5% and approximately 50% on a dry weight basis. In some embodiments, the aerosol forming material may comprise an aerosol-former content of between approximately 10% and approximately 20% on a dry weight basis, and possibly approximately 15% on a dry weight basis.

Also, the aerosol forming material may be the aerosol-former itself. In this case, the aerosol forming material may be a liquid. Also, in this case, the aerosol generating article may include a liquid retaining substance (e.g., a bundle of fibres, porous material such as ceramic, etc.) which retains the liquid to be aerosolized and allows an aerosol to be formed and released/emitted from the liquid retaining substance, for example towards an outlet for inhalation by a user.

Upon heating, the aerosol forming material may release volatile compounds. The volatile compounds may include nicotine or flavour compounds such as tobacco flavouring.

Different regions of the body may comprise different types of aerosol forming material, may include different aerosol-formers or have different aerosol-former content, or may release different volatile compounds upon heating.

There is no restriction on the shape and form of the aerosol generating article. In some embodiments, the aerosol generating article may be substantially cylindrical in shape and as such the heating chamber may be arranged to receive a substantially cylindrical article. This may be advantageous as, often, vaporisable or aerosolable substances and tobacco products in particular, are packaged and sold in cylindrical form. Furthermore, it is convenient to use an induction coil assembly where the tubular construction is a substantially cylindrical construction and so providing the aerosol generating articles in a cylindrical form is advantageous as they may be sized to fit efficiently within the induction coil assembly with minimum use of excess material. It will be understood that an induction coil assembly having a "tubular construction" is not limited to a cylindrical construction (i.e., with a substantially circular cross section) but merely defines that the induction coil assembly has the form or shape of a tube, typically an open-ended tube, with any suitable cross section. As described in more detail below, in one specific embodiment of the disclosure, an induction coil assembly having a tubular construction may be wound in a spiral shape with a suitable number of turns about an axis of the induction coil assembly.

The aerosol forming material may be held inside an air permeable material. This may comprise an air permeable material which is electrically insulating and non-magnetic. The material may have a high air permeability to allow air to flow through the material with a resistance to high temperatures. Examples of suitable air permeable materials include cellulose fibres, paper, cotton and silk. The air permeable material may also act as a filter. In one embodiment, the aerosol forming material may be wrapped in paper. The aerosol forming material may also be held inside a material that is not air permeable, but which comprises appropriate perforations or openings to allow air flow, or where the material does not cover the whole of the aerosol forming material. For example, the aerosol forming material might be held within a tube of material that is not air permeable but whose ends are open to permit air flow through the aerosol forming material. Alternatively, the aerosol generating article may consist of the body of aerosol forming material itself.

The electrically conductive track and the electrically insulating layer may be bonded or fixed together so that the induction coil assembly has a simple and reliable structure. In one embodiment, the electrically conductive track may be formed on the electrically insulating layer. Alternatively, the electrically conductive track and the electrically insulating layer are not be bonded or fixed together but may be positioned adjacent to each other in the induction coil assembly.

The induction coil assembly may comprise two or more electrically conductive tracks. The electrically conductive tracks may be bonded or fixed to the electrically insulating layer or formed on the electrically insulating layer. The electrically conductive tracks may be spaced apart in the axial direction of the induction coil assembly. Each electrically conductive track defines an induction coil generating an alternating electromagnetic field for heating one or more susceptors in the aerosol generating article by inducing eddy current and/or magnetic hysteresis losses in the susceptors. The electrically conductive tracks may be evenly or unevenly spaced apart in the axial direction to provide a desired electromagnetic field distribution and/or desired heating of the aerosol forming material when an aerosol generating article is positioned in the heating chamber.

Just one side of each electrically conductive track may be bonded or fixed to the electrically insulating layer with the other side of each electrically conductive track remaining unbonded or unfixed. Such an induction coil assembly has a compact size. Alternatively, one side of each electrically conductive track may be bonded or fixed to the electrically insulating layer and the other side of each electrically conductive track may be bonded or fixed to a second electrically insulating layer. Such an induction coil assembly may have good electrical insulation because each electrically conductive track is sandwiched or embedded between two electrically insulating layers.

The induction coil assembly may include a plurality of electrically insulating layers and electrically conductive tracks arranged or stacked alternately. Such an induction coil assembly may have a simple and reliable construction with good electrical insulation between the electrically conductive tracks.

Each electrically insulating layer may be formed as a strip of insulating material such as a polyamide or polyimide, for example.

Each electrically conductive track may be formed as a strip of electrically conductive material or as a layer of electrically conductive material (e.g., that is formed on the electrically conductive layer). The electrically conductive material can be a metal such as copper, stainless steel or aluminium, for example. The exposed outer surface of the electrically conductive track can be increased in order to reduce the electrical resistance of the track and to prevent its temperature from reaching unacceptable levels. For example, the electrically conductive track may be formed from a woven sheet comprising thin metal wires (i.e., multistrand electrically conductive track) or the track may include a plurality of micro holes or slits extending along its longitudinal direction.

In one embodiment, the axial height of each electrically conductive track (i.e., its dimension in the axial direction of the induction coil assembly) does not change substantially along the circumferential direction of the induction coil assembly. It will be readily understood that any reference herein to the "circumferential direction" means the direction along the spiral shape of the induction coil assembly, i.e., from the radially innermost edge of the induction coil assembly to the radially outermost edge or vice versa. The axial height of the electrically conductive track may be substantially the same as the axial height of the electrically insulating layer, which provides an induction coil assembly with a simple and reliable structure. Alternatively, the axial height of each electrically conductive track may change or vary along the circumferential direction of the induction coil assembly. For example, the axial height of the electrically conductive track may increase or decrease along the circumferential direction of the induction coil assembly. The position of each electrically conductive track in the axial direction relative to the induction coil assembly as a whole may be the same along the circumferential direction of the induction coil assembly or may change or vary along the circumferential direction of the induction coil assembly. Changing the axial height and/or the axial position of each electrically conductive track along the circumferential direction of the induction coil assembly means that each electrically conductive track may define an induction coil having a particular shape and configuration within the three-dimensional space that is defined by the substantially tubular construction of the overall induction coil assembly.

The axial height of the electrically conductive track may be substantially equal to, or greater than, half of the depth of the part of the heating chamber that overlaps with the body of aerosol forming material of the aerosol generating article when it is received in the heating chamber. The depth of the heating chamber is its dimension in the axial direction of the induction heating assembly. Such an arrangement typically provides effective heating of the aerosol forming material.

The induction coil assembly as a whole may have a spiral construction such that it winds around the heating chamber at a continuously increasing distance from its central axis. The induction coil assembly may have any appropriate number of turns, for example four or more, with each turn overlapping with the preceding turn to form the spiral construction. In other words, the induction coil assembly may be wound at least four times around the heating chamber. This may provide a good balance between the physical size of the induction coil assembly and its heating efficiency when the induction coil assembly is implemented in an aerosol generating device. Adjacent turns of the induction coil assembly may be bonded or fixed to each other, e.g., using an adhesive layer, to form a compact structure.

The electrically insulating layer may have a spiral construction. The electrically insulating layer may be interposed between adjacent turns of the electrically conductive track, for example to maintain good electrical insulation.

Each electrically conductive track of the induction coil assembly may have a spiral construction or a helical construction. The electrically conductive track may have any appropriate number of turns, for example four or more. This may provide a good balance between the physical size of the induction coil assembly and its heating efficiency. As described in more detail below, each electrically conductive track may have a spiral construction if its axial position relative to the induction coil assembly as whole does not change along the circumferential direction of the induction coil assembly, such that the electrically conductive track winds around the heating chamber at a continuously increasing distance from the central axis of the induction coil assembly and each turn overlaps with the preceding turn to form the spiral construction. Each electrically conductive track may have a helical construction if its axial position relative to the induction coil assembly as a whole changes or varies along the circumferential direction of the induction coil assembly, such that the electrically conductive track winds around the heating chamber at a continuously increasing distance from the central axis of the induction coil assembly and each turn is offset from the preceding turn in the axial direction (i.e., the turns do not fully overlap, but may still partially overlap) to form the helical construction.

At least one end of each electrically conductive track may include a connector leg that projects from the electrically conductive track and allows for an electrical connection to be made in a simple and reliable way to a separate part of the aerosol generating device (e.g., a body assembly) that may comprise a controller and/or a power source for the induction coil assembly. Most preferably, both ends of each electrically conductive track include a respective connector leg that project from the electrically conductive track in the same direction, typically the axial direction. This results in a simple and compact structure for the induction heating assembly. In one embodiment an additional connector leg may be provided between the end connector legs, e.g., at an intermediate part of each electrically conductive track. Such an induction coil assembly may be referred to as a "centre tapped" induction coil assembly. The additional connector leg may be provided at or near to a centre part of each electrically conductive track along its circumferential direction. The additional connector leg may project from the electrically conductive track in the same direction as the connector legs at both ends of the electrically conductive track. The additional connector leg may be electrically connected to a power source such as a direct current (DC) power source, for example, preferably by means of a low-pass filter. The low-pass filter may comprise a choke coil, for example. Such a "centre tapped" induction coil assembly can be efficient to operate and can simplify the design of the electronic circuit to which the induction coil assembly is connected.

Each connector leg may project beyond the induction heating assembly so as to be exposed for the purpose of making an electrical connection with the body assembly of the aerosol generating device. Each connector leg may be electrically connected to two or more electrically conductive tracks if present in the induction coil assembly. For example, if two or more electrically conductive tracks are bonded or fixed to, or formed on, the electrically insulating layer and are spaced apart in the axial direction, the two or more electrically conductive tracks may be connected in parallel between two connector legs. Alternatively, if two or more electrically conductive tracks are present in the induction coil assembly, each electrically conductive track may be connected respectively to two connector legs. This can provide improved control over the electromagnetic field that is generated by the induction coil assembly.

Each connector leg may be engaged with a corresponding connector of the body assembly of the aerosol generating device. Each connector leg may be provided with a first type of connector end and the corresponding connector of the body assembly may be provided with a second type of connector end that is engageable with the first type of connector end.

The induction heating assembly may comprise a support that defines the heating chamber. More particularly, the heating chamber may be defined by one or more walls of the support. In one embodiment, the support may comprise a substantially cylindrical wall which defines a heating chamber that is suitable for receiving substantially cylindrical aerosol generating articles.

The support may be formed of any suitable material, for example a plastics material such as polyether ether ketone (PEEK) or a ceramic material such as alumina, zirconia, silicates etc. which have good thermal properties, may be manufactured cost-effectively in high volume, and are relatively inert.

The induction coil assembly may be mounted on the support for a simple and reliable structure. The induction heating assembly may comprise a base with a first surface that supports an axial end of the induction coil assembly. The induction heating assembly may comprise a top with a surface that supports the other axial end of the induction coil assembly. One or both of the base and the top may be an integral part of the support on which the induction coil assembly is mounted. In one embodiment, the base and the top may be formed as outwardly extending flanges between which the induction coil assembly is axially positioned with its axial ends supported by the oppositely facing flange surfaces. The wall(s) of the support that define the heating chamber may extend between the base and the top, e.g., between the two outwardly extending flanges. Such a structure may help to support and guide the induction coil assembly if it is wound in situ around the support, i.e., where the support acts as a coil former—see below. The induction coil assembly may be secured or fixed to the support, for example by a suitable adhesive, to maintain the induction coil assembly in position relative to the heating chamber. This provides reliable heating because the positional relationship between the induction coil assembly and the susceptor in the aerosol generating article that is received in the heating chamber is important.

One or more air inlets may be formed at the bottom of the heating chamber. The air inlet(s) may be formed in the base of the induction heating assembly, for example. If two or more air inlets are provided, they are preferably spaced substantially evenly across the bottom of the heating chamber.

The connector legs may pass through slots or openings in the base of the induction heating assembly so that the connector legs project outwardly from the base in the axial direction and are positioned to be engaged with the corresponding connectors in the other part of the aerosol generating device. The induction heating assembly may be adapted to be releasably connected to the other part of the aerosol generating device, for example the body assembly.

In an alternative embodiment, the slots or openings in the base of the induction heating assembly may receive the corresponding connectors of the body assembly so that an electrical connection can be made with the connector legs. More particularly, the connectors may be formed so that they project outwardly from the other part of the aerosol generating device (for example, the body assembly) and pass through the slots or openings in the base so that they are positioned to engage with the connector legs.

The induction heating assembly may comprise an electromagnetic shield that substantially surrounds the induction coil assembly. The induction heating assembly therefore has a simple and reliable structure for shielding the electromagnetic field that is generated by the induction coil assembly in use. The base of the induction heating assembly may comprise a second surface that supports an axial end of the electromagnetic shield. The electromagnetic shield is preferably secured or fixed to the second surface, for example, by a suitable adhesive. A gap may be maintained between the induction coil assembly and the electromagnetic shield to provide thermal insulation between the respective components. Providing a gap between the induction coil assembly and the electromagnetic shield may also help to ensure a desired field distribution of the generated electromagnetic field within the heating chamber, i.e., the gap can be used to "shape" the electromagnetic field. The gap may be maintained in a simple and reliable manner by one or more spacers positioned between the outer surface of the induction coil assembly and the inner surface of the electromagnetic shield. The spacers may be formed as projections on one or both of the electromagnetic shield and the base of the induction heating assembly (for example, on the support), and they may be spaced apart in the circumferential direction.

According to a second aspect of the present disclosure there is provided an induction heating assembly for an aerosol generating device, the induction heating assembly comprising a heating chamber for receiving, in use, an aerosol generating article, and an induction coil assembly substantially surrounding the heating chamber, the induction coil assembly comprising an electrically conductive track, wherein at least part of the electrically conductive track overlaps with another part of the electrically conductive track in an axial direction.

The induction coil assembly may comprise an electrically insulating layer that is located at least between the overlapping parts of the electrically conductive track.

Other features of the induction heating assembly according to the second aspect of the present disclosure may be as described above for the first aspect.

According to a third aspect of the present disclosure there is provided an aerosol generating device comprising an induction heating assembly as described above.

The aerosol generating device may be arranged to accommodate aerosol generating articles according to a first type that include an integral filter through which a user may inhale the aerosol released on heating. The aerosol generating device may also be arranged to accommodate aerosol generating articles according to a second type and where the device may further comprise a mouthpiece.

The aerosol generating device may comprise a body assembly to which the induction heating assembly is connected, optionally in a releasable manner. The body assembly may comprise a controller and/or a power source for the induction heating assembly. The controller may comprise a programmable, digital controller.

The body assembly may comprise one or more connectors, each connector being adapted to engage with a respective connector leg of the induction heating assembly. The use of the connectors provides a simple and reliable way of providing an electrical connection between the induction heating assembly and the body assembly of the aerosol generating device.

According to a fourth aspect of the present disclosure there is provided a method of manufacturing an induction heating assembly comprising the steps of:

forming a heating chamber; and forming or positioning an induction coil assembly substantially around the heating chamber, the induction coil assembly comprising (i) an electrically insulating layer and an electrically conductive track, wherein the induction coil assembly has a substantially tubular construction and wherein at least part of the induction coil assembly overlaps with another part of the induction coil assembly in an axial direction or (ii) an electrically conductive track, wherein at least part of the electrically conductive track overlaps with another part of the electrically conductive track in an axial direction.

This provides a simple way of manufacturing an induction heating assembly with a variety of different induction coil assemblies.

As described above, the induction coil assembly as a whole may have a spiral construction with an appropriate number of turns, for example four or more. The induction coil assembly may be pre-formed and then positioned so that it substantially surrounds the heating chamber. Alternatively, the induction coil assembly may be wound in situ around the heating chamber, and in particular by winding it around a support that defines the heating chamber and which acts as a coil former. The heating chamber may be defined by one or more walls of the support and the induction coil assembly may be wound around the wall(s) with the appropriate number of turns.

The support may comprise at least one flange (e.g., as part of a base or top of the support) that extends outwardly from the wall(s) that define the heating chamber. Each flange may support a respective axial end of the induction coil assembly. Each flange may also help to support and guide the induction coil assembly during an in situ winding process.

Adjacent turns of the induction coil assembly may be bonded or fixed to each other, e.g., using an adhesive layer, to form a compact structure.

The induction coil assembly may comprise at least one connector leg in electrical connection with an end of the electrically conductive track. Typically, two connector legs will be formed, each connector leg being in electrical connection with a respective end of the electrically conductive track. Each connector leg may project from the electrically conductive track or induction heating assembly to allow for an electrical connection to be made in a simple and reliable way to a separate part of an aerosol generating device (e.g., a body assembly) that may comprise a controller and/or a power source for the induction coil assembly.

The method may comprise the step of electrically connecting each connector leg to a connector of a body assembly of an aerosol generating device.

The method may comprise the step of forming or positioning an electromagnetic shield that substantially surrounds the induction coil assembly. The electromagnetic shield may be pre-formed and then positioned around the induction coil assembly, for example, by being fixed to the support. In this case, the electromagnetic shield may be spaced apart from the induction coil assembly by a gap that provides thermal insulation and may help to ensure a desired field distribution of the generated electromagnetic field within the heating chamber. Alternatively, the electromagnetic shield may be formed or wound around the induction coil assembly.

Other features of the induction heating assembly formed by the method according to the fourth aspect of the present disclosure may be as described above for the first aspect.

DETAILED DESCRIPTION OF THE EMBODIMENTS

Figure 1:
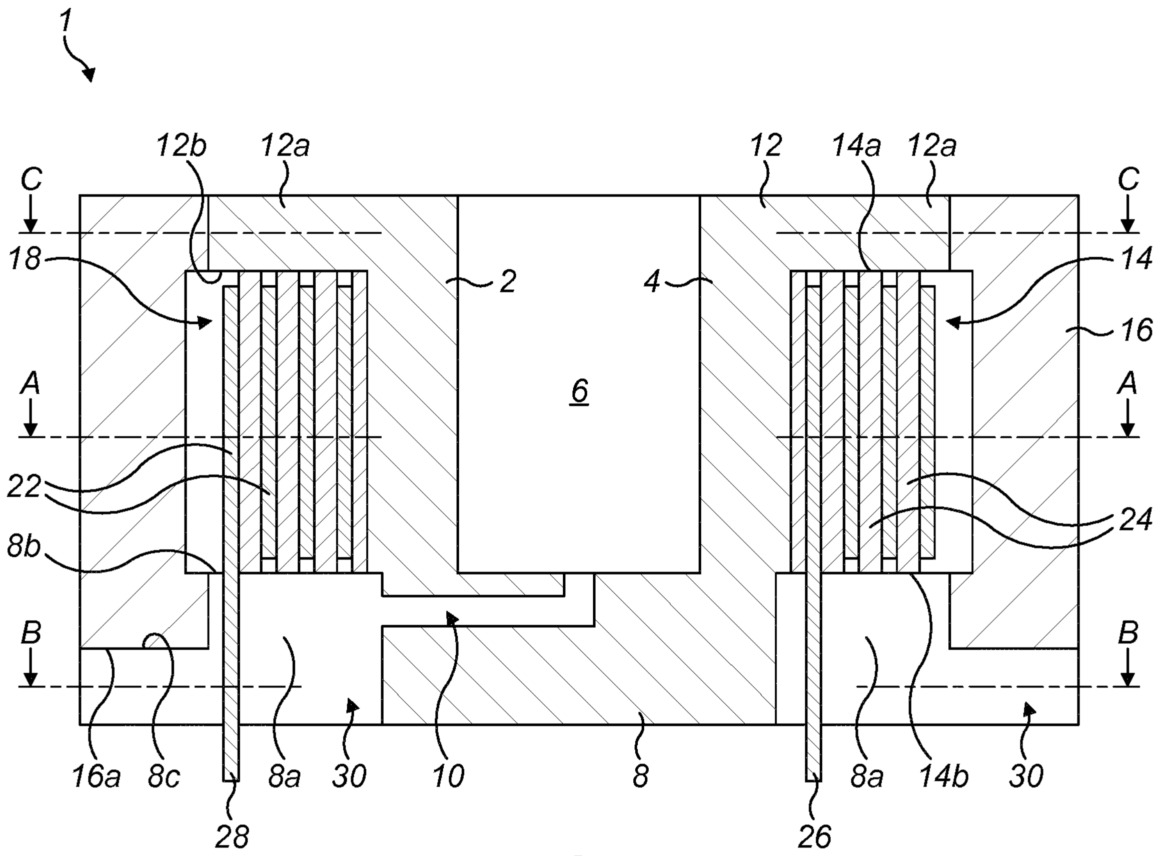
FIG. 1 is a diagrammatic cross-sectional view of an embodiment of an induction heating assembly.

Embodiments of the present disclosure will now be described by way of example only and with reference to the accompanying drawings.

Referring to FIGS. 1 to 4, there is shown diagrammatically an induction heating assembly 1 according to an embodiment of the disclosure.

The induction heating assembly 1 comprises a support 2 having a substantially cylindrical wall 4 that defines a heating chamber 6. The support 2 includes a base 8 that defines the bottom of the heating chamber 6 and which includes a radially outwardly extending flange 8*a*. An air inlet 10 is formed in the base 8 at the bottom of the heating chamber 6.

The support 2 also includes a top 12 that defines an opening of the heating chamber 6 and which includes a radially outwardly extending flange 12*a*.

The support 2 is integrally formed from a plastics material such as polyether ether ketone (PEEK), for example.

The induction heating assembly 1 comprises an induction coil assembly 14. The induction coil assembly 14 has a spiral construction that will be described in more detail below and generally takes the form of an open-ended tube with a substantially circular cross section. The induction coil assembly 14 is mounted on the support 2 and surrounds the heating chamber 6. More particularly, the induction coil assembly 14 is positioned radially outside the substantially cylindrical wall 4 defining the heating chamber 6 and axially between the flanges 8*a*, 12*a* of the base and top of the support. The axial ends 14*a*, 14*b* of the induction coil assembly 14 are supported by oppositely facing annular flange surfaces 8*b*, 12*b* of the base and top as shown.

Figure 4:
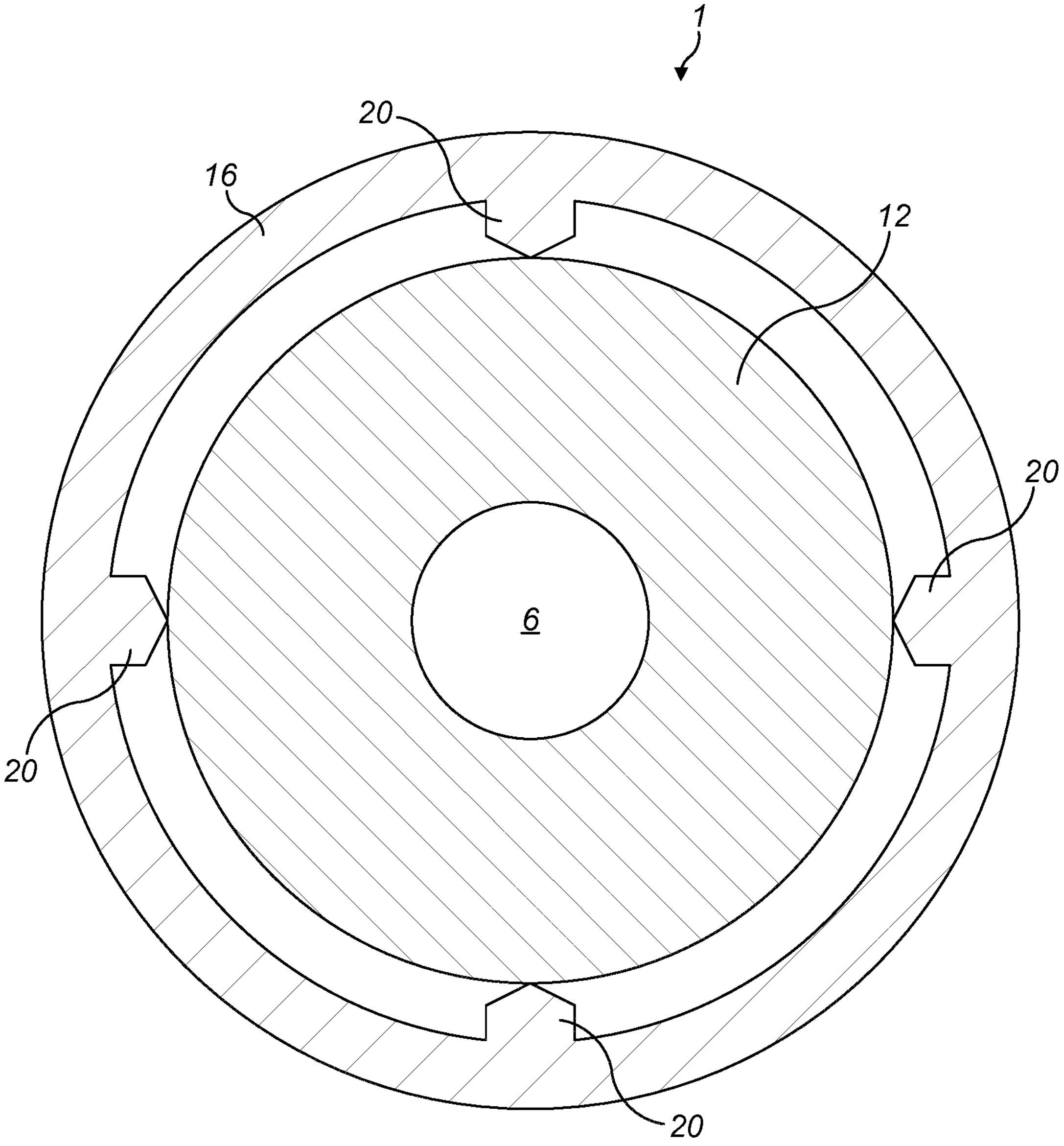
FIG. 4 is a diagrammatic cross-sectional view of the embodiment of the induction heating assembly of FIG. 2 along line C-C.

A substantially cylindrical electromagnetic shield 16 substantially surrounds the induction coil assembly 14. The base 8 includes an annular flange surface 8*c* that supports an axial end 16*a* of the electromagnetic shield 16. A radial gap 18 is maintained between the induction coil assembly 14 and the electromagnetic shield 16 to provide thermal insulation between the components and to ensure a desired field distribution of the generated electromagnetic field within the heating chamber 6. The gap 18 between the induction coil assembly 14 and the electromagnetic shield 16 is maintained by circumferentially spaced spacers in the form of four radially inwardly extending protrusions 20 formed on the radially inner surface of the electromagnetic shield at a top part of the electromagnetic shield and four radially inwardly extending protrusions 20 formed on the radially inner surface of the electromagnetic shield at a bottom part of the electromagnetic shield. The bottom protrusions 20 are in contact with the substantially cylindrical radially outer surface of the flange 8*a* and the top protrusions 20 are in contact with the substantially cylindrical radially outer surface of the top 12*a* as shown in FIGS. 1 and 4. In an alternative embodiment, the spacers may be formed on the base of the support, for example. The induction coil assembly 14 may be secured or fixed to the support 2, for example by a suitable adhesive, to maintain the induction coil assembly in position relative to the heating chamber 6.

Figure 5:
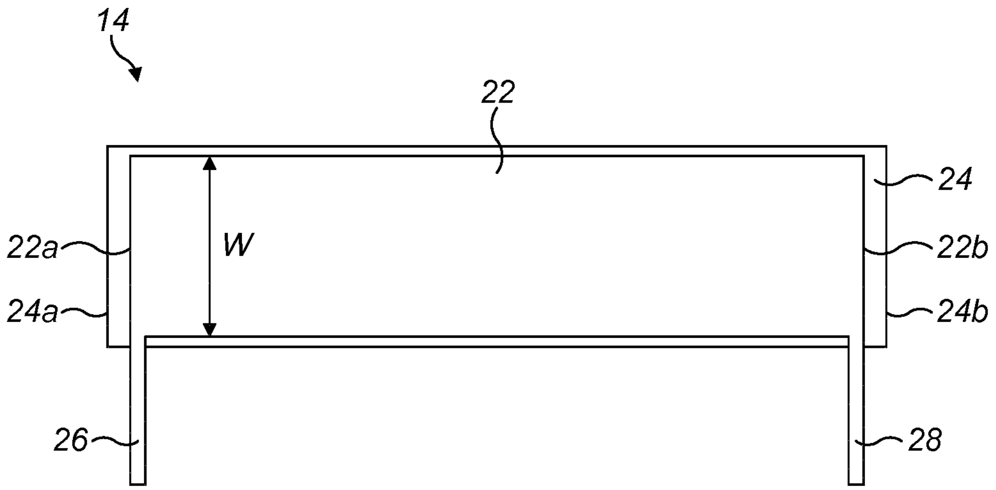
FIG. 5 is a diagrammatic view of a first embodiment of an induction coil assembly before it is wound.

Referring also to FIG. 5, which shows diagrammatically the induction coil assembly 14 before it is wound into the spiral construction, the induction coil assembly comprises a strip 22 of electrically conductive material that is bonded or fixed to an electrically insulating layer 24. The electrically conductive material may be a metal such as copper, stainless steel or aluminium, for example. The electrically insulating layer 24 may be a polyamide or polyimide layer, for example. The strip 22 extends along the length of the unwound electrically insulating layer 24, i.e., from a first end 24*a* to a second end 24*b*. It will be readily understood that the direction along the length of the unwound induction coil assembly 14 shown in FIG. 5 corresponds to the circumferential direction of the induction coil assembly when wound into the spiral construction. Similarly, the direction along the width of the unwound induction coil assembly 14 shown in FIG. 5 corresponds to the axial direction of the induction coil assembly when wound into the spiral construction.

In one embodiment, the induction coil assembly 14 is formed from a copper strip that is about 0.2 mm thick and about 6.5 mm wide that is bonded or fixed to a polyimide (Kapton®) tape with a suitable adhesive.

Figure 2:
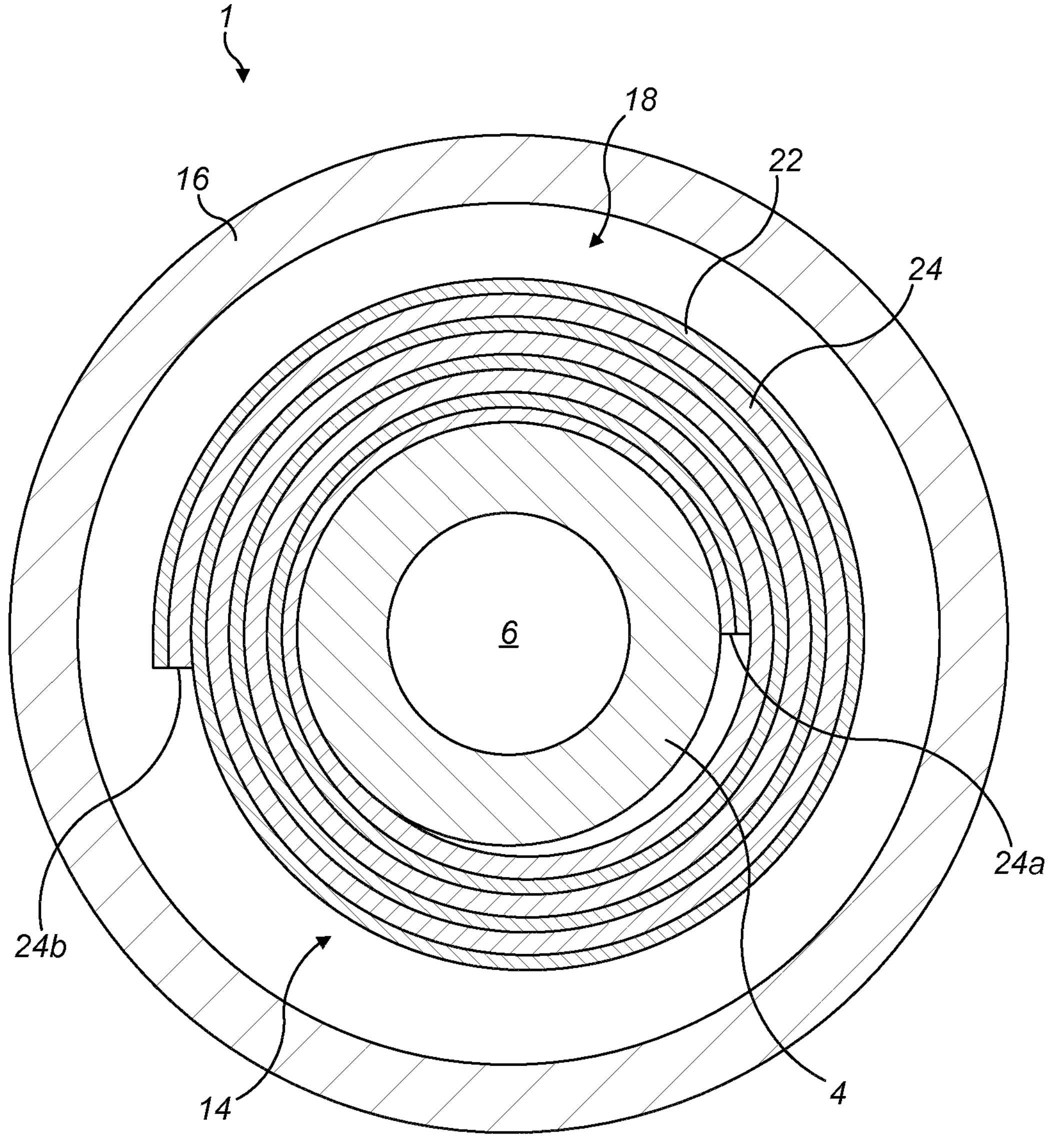
FIG. 2 is a diagrammatic cross-sectional view of the embodiment of the induction heating assembly of FIG. 1 along line A-A.
Figure 3:
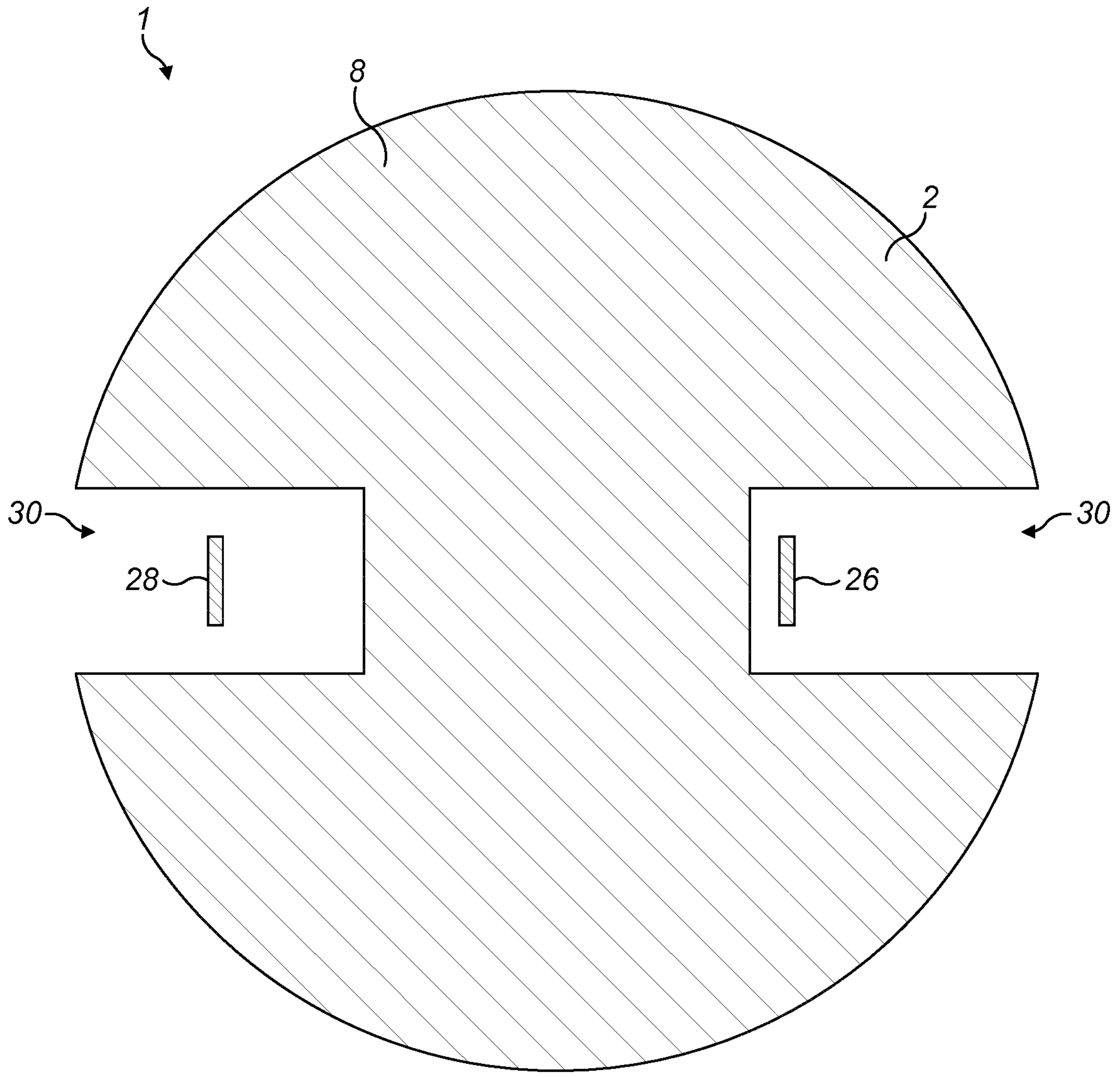
FIG. 3 is a diagrammatic cross-sectional view of the embodiment of the induction heating assembly of FIG. 2 along line B-B.

FIGS. 1 and 2 show diagrammatically the induction coil assembly 14 after it has been wound into the spiral construction. The strip 22 of electrically conductive material and the electrically conductive layer 24 to which it is bonded or fixed are wound around the heating chamber 6 at a continuously increasing distance from the central axis of the induction coil assembly. Each turn of the induction coil assembly 14 overlaps fully with the preceding turn to form the spiral construction. Part of the induction coil assembly 14 overlaps with another part of the induction coil assembly in the axial direction.

The induction coil assembly 14 may be wound in situ around the substantially cylindrical wall 4 of the support 2 with the strip 22 and the electrically insulating layer 24 being guided during the winding process by the facing annular flange surfaces 8*b*, 12*b*. In this embodiment the support 2 is acting as a coil former. Alternatively, if the support is suitably modified, the induction coil assembly may be pre-formed and then positioned around the heating chamber 6.

In the wound induction coil assembly 14, the axial position of the strip 22 of electrically conductive material does not change along the circumferential direction of the induction coil assembly 14. The strip 22 winds around the heating chamber 6 at a continuously increasing distance from the central axis of the induction coil assembly and each turn overlaps fully with the preceding turn to form the spiral construction. The strip 22 of electrical conductive material defines an induction coil. Although the strip 22 is only bonded or fixed on one side to the electrically insulating layer 24, it can be seen from FIG. 2, in particular, that the spiral construction of the induction coil assembly 14 as a whole means that adjacent turns of the strip 22 are insulated from each other by the interposing electrically insulating layer 24.

A first connector leg 26 projects from a first end 22*a* of the strip 22 and a second connector leg 28 projects from a second end 22*b* of the strip. The first and second connector legs 26, 28 project beyond the induction coil assembly 14 in the axial direction as shown. The first connector leg 26 is located at the radially innermost part of the wound strip 22 and the second connector leg 28 is located at the radially outermost part of the wound strip. Referring to FIG. 2, during the winding process, the unwound induction coil assembly 14 may be positioned with the first end 22*a* of the strip 22 adjacent the substantially cylindrical wall 4 and spaced apart therefrom by the electrically insulating layer 24 and the strip and the electrically insulating layer are then wound together around the substantially cylindrical wall 4 in a counter-clockwise direction.

The first and second connector legs 26, 28 pass through slots 30 formed in the base 8 of the support 2.

The induction coil assembly 14 has 4.5 turns, i.e., it extends four and a half times around the heating chamber 6. The half turn means that the first and second connector legs 26, 28 are conveniently positioned diametrically opposite each other. The slots 30 are also formed diametrically opposite to each other in the base 8.

Figure 6:
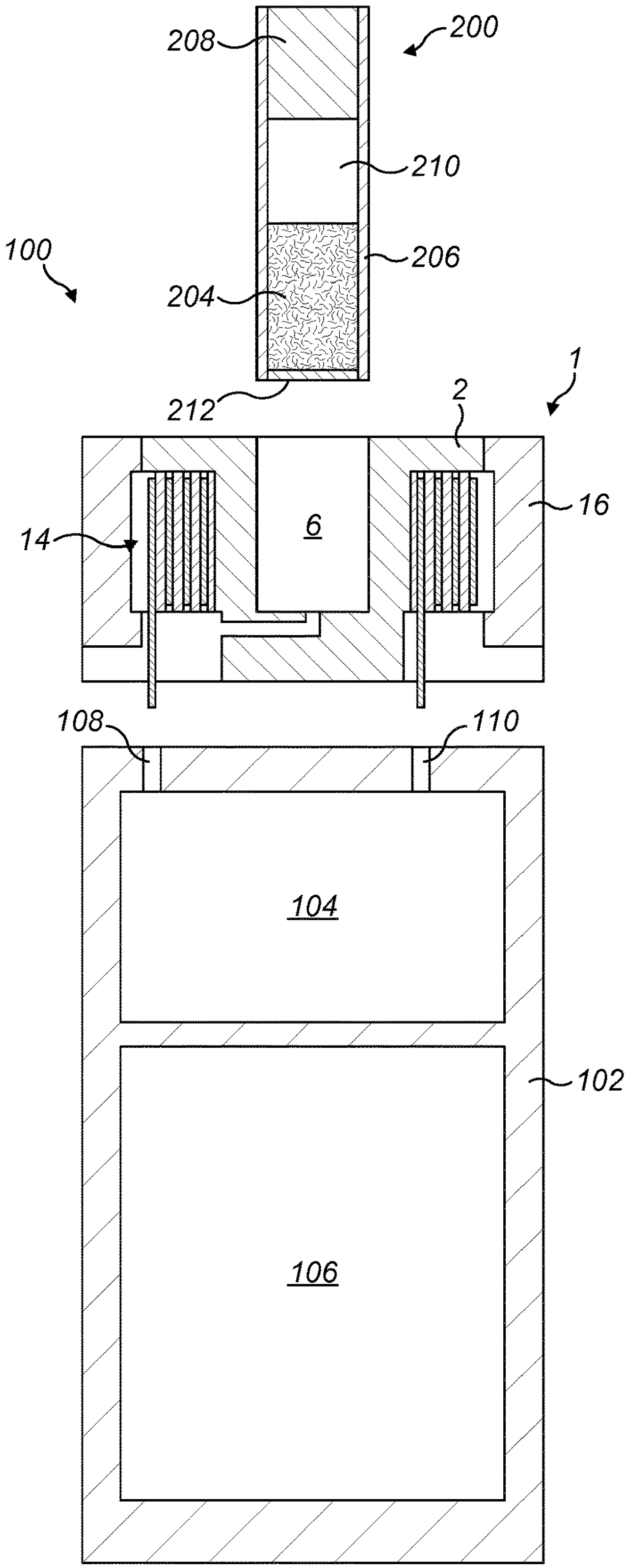
FIG. 6 is a diagrammatic cross-sectional view of an embodiment of an aerosol generating device before an induction heating assembly is connected to a body assembly and before an aerosol generating article is received in the induction heating assembly.
Figure 7:
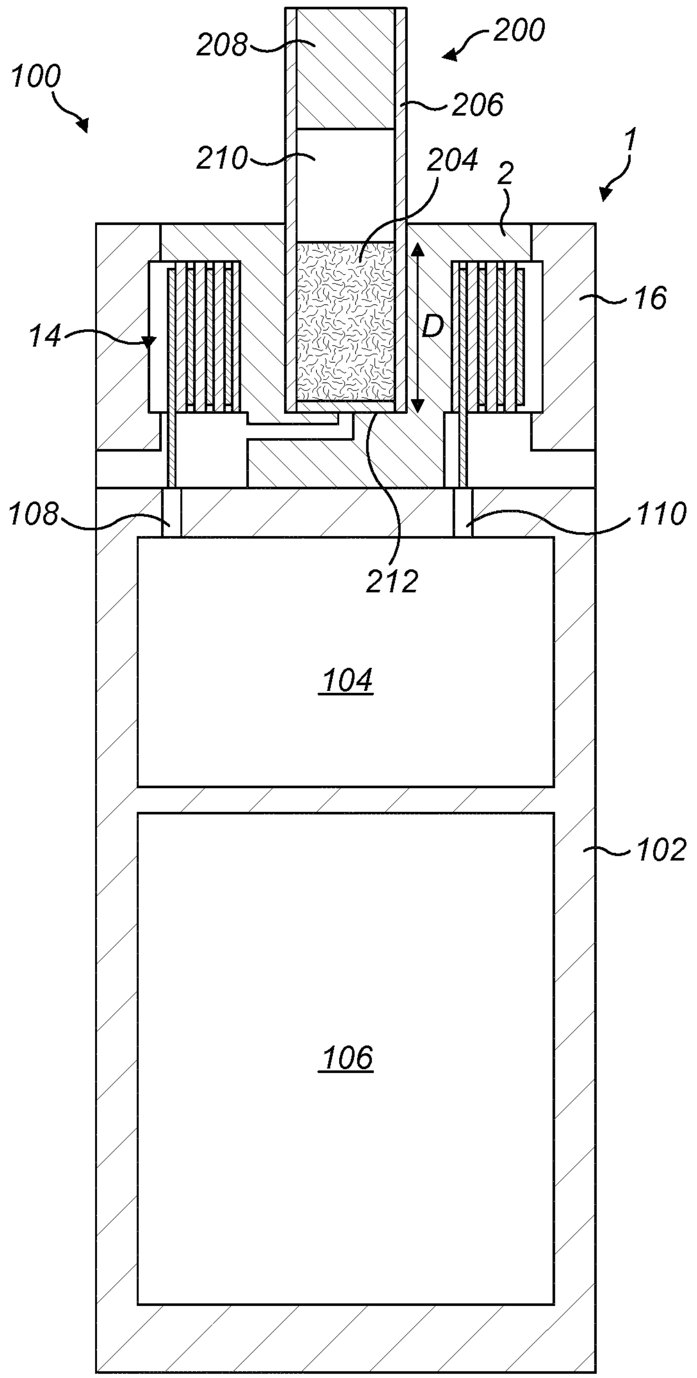
FIG. 7 is a diagrammatic cross-sectional view of the aerosol generating device of FIG. 6 with the induction heating assembly connected to the body assembly and the aerosol article received in the induction heating assembly.

Referring to FIGS. 6 and 7, there is shown diagrammatically an aerosol generating device 100 according to an embodiment of the disclosure. The induction heating assembly 1 described above with reference to FIGS. 1 to 5 forms part of the aerosol generating device 100. The aerosol generating device 100 further comprises a body assembly 102 with a controller (e.g., a digital controller) 104 and a power source 106 such as a rechargeable battery.

The body assembly 102 includes a first connector 108 and a second connector 110. The first and second connectors 108, 110 are adapted to be engaged with the first and second connector legs 26, 28 of the induction coil assembly 14 to provide an electrical connection between the body assembly 102 and the induction heating assembly 1. The induction heating assembly 1 may be designed to be releasably connected to the body assembly 102 (e.g., to permit a replacement induction heating assembly to be fitted) and in this case the engagement between the first and second connectors 108, 110 and the first and second connector legs 26, 28 may be releasable engagement. The first and second connector legs 26, 28 may be provided with a first type of connector end and the first and second connectors 108, 110 may be provided with a second type of connector end that is engageable with the first type of connector end. FIG. 7 shows diagrammatically how the induction heating assembly 1 may be connected to the body assembly 102 with the first connector leg 26 engaged with the first connector 108 and the second connector leg 28 engaged with the second connector 110. An electrical connection is therefore provided between the induction coil assembly 14 (and in particular, the strip 22 of electrically conductive material that defines the induction coil) and the controller 104 and the power source 106 of the body assembly 102. The induction coil assembly 14 may therefore be controlled by the controller 104 to generate an electromagnetic field for heating one or more susceptors in an aerosol generating article by inducing eddy current and/or magnetic hysteresis losses in the susceptors.

An example of one type of aerosol generating article 200 is shown diagrammatically in FIGS. 6 and 7. In FIG. 7 the aerosol generating article 200 is received in the heating chamber 6 of the induction heating assembly 1 where it can be heated. The aerosol generating article 200 comprises a body of aerosol forming material 204. The aerosol forming material 204 comprises one or more susceptors (not shown) and releases volatile compounds upon heating. The volatile compounds may include nicotine or flavour compounds such as tobacco flavouring. The aerosol generating article 200 is substantially cylindrical in shape and the aerosol forming material 204 is held inside a tube 206 of air impermeable material such as paper, for example.

A filter 208 is provided at one end of the aerosol forming article 200 through which a user may inhale the aerosol released on heating. The filter 208 is spaced apart from the body of aerosol forming material 204 by a cooling space 210. An air permeable filter or cap 212 is provided at the other end of the aerosol generating article 200 to contain the aerosol forming material 204. In use, when the aerosol generating article 200 is received in the heating chamber 6, the filter or cap 212 is positioned adjacent the base 8 of the support 2 as shown diagrammatically in FIG. 7. Air may be drawn through the air inlet 10 and into the aerosol generating article 200 through the filter or cap 212.

The depth D of the heating chamber 6 may be defined as its dimension in the axial direction of the induction heating assembly 1 that overlaps with the body of aerosol forming material 204 when the aerosol generating article 200 is received in the heating chamber 6. The width of the unwound strip 22 of electrically conductive material defines the axial height of the wound induction coil and may be substantially equal to, or greater than, half of the depth D to provide effective heating of the aerosol forming material 204. In the induction coil assembly 14 shown diagrammatically in FIGS. 1 to 7, the axial height of the strip 22 of electrically conductive material remains the same along the circumferential direction of the induction coil assembly 14. This is most clearly shown in FIG. 5 where the width W of the unwound strip 22 is shown to be slightly less than the width of the unwound electrically insulating layer 24 and remains substantially the same along the full length of the electrically insulating layer, i.e., from the first end 24*a* to the second end 24*b*, and hence along the circumferential direction of the wound induction coil assembly 14.

Figure 8:
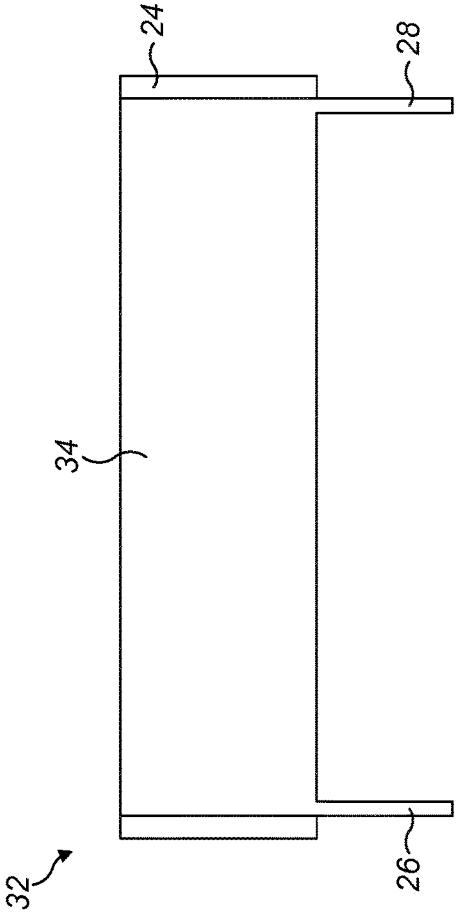
FIG. 8 is a diagrammatic view of a second embodiment of an induction coil assembly before it is wound.
Figure 9:
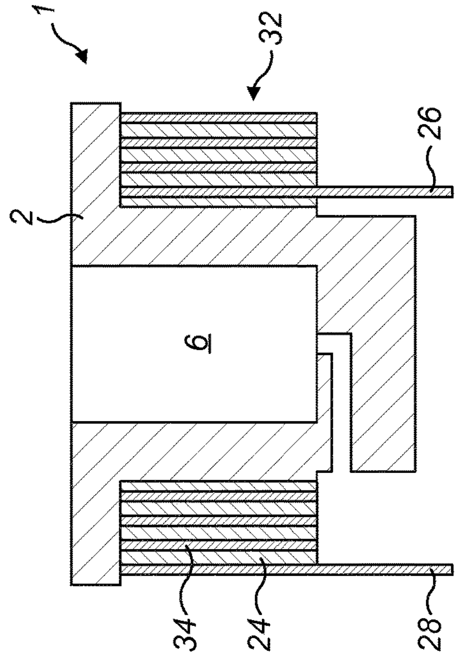
FIG. 9 is a diagrammatic cross-sectional view of an embodiment of an induction heating assembly comprising the induction coil assembly of FIG. 8.

In FIGS. 8 and 9 there is shown diagrammatically an induction coil assembly 32 according to a second embodiment of the disclosure. The induction coil assembly 32 is similar to the induction coil assembly 14 described with reference to FIGS. 1 to 7 and like parts have been given the same reference sign. In the induction coil assembly 32 the axial height of a strip 34 of electrically conductive material is substantially the same as the height of an electrically insulating layer 24, thereby providing a construction that is easy to manufacture. This is most clearly shown in FIG. 8 where the width of the unwound strip 34 is shown to be the same as the width of the unwound electrically insulating layer 24 and remains substantially the same along the full length of the electrically insulating layer, and hence along the circumferential direction of the wound induction coil assembly 32.

Figure 10:
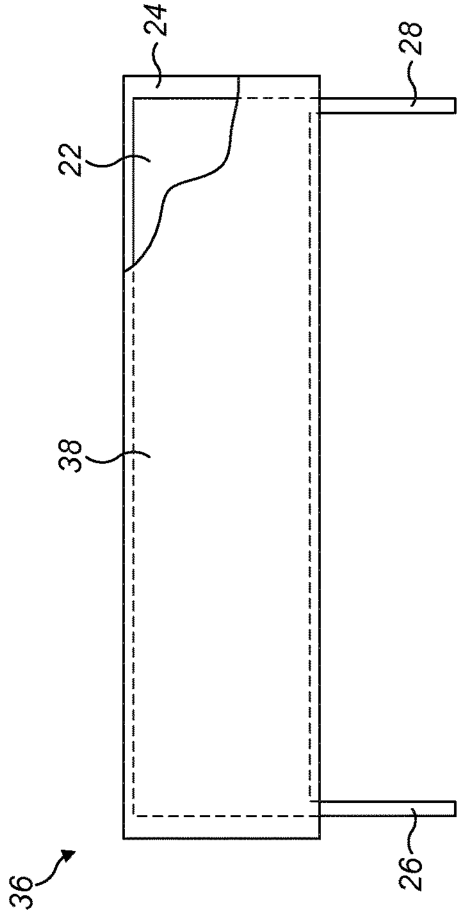
FIG. 10 is a diagrammatic view of a third embodiment of an induction coil assembly before it is wound.
Figure 11:
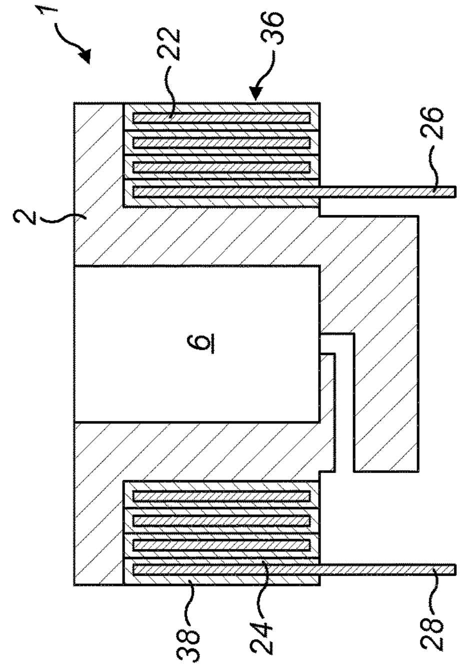
FIG. 11 is a diagrammatic cross-sectional view of an embodiment of an induction heating assembly comprising the induction coil assembly of FIG. 10.

In FIGS. 10 and 11 there is shown diagrammatically an induction coil assembly 36 according to a third embodiment of the disclosure. The induction coil assembly 36 is similar to the induction coil assemblies 14, 32 described with reference to FIGS. 1 to 9 and like parts have been given the same reference sign. In the induction coil assemblies 14, 32 described above, just one side of the strip 22, 34 of electrically conductive material is bonded or fixed to the electrically insulating layer 24. The other side of the strip 22, 34 remains unbonded or unfixed but is positioned adjacent the electrically insulating layer of the radially adjacent turn when the induction coil assembly 14, 32 is wound into the spiral construction. In the induction coil assembly 36 shown in FIGS. 10 and 11, a strip 22 of electrically conductive material is bonded or fixed to a first electrically insulating layer 24 and to a second electrically insulating layer 38 so that the strip 22 is sandwiched or embedded between them. In FIG. 10, part of the second electrically insulating layer 38 has been removed to show the strip 22 and the first electrically insulating layer 24.

Figure 12:
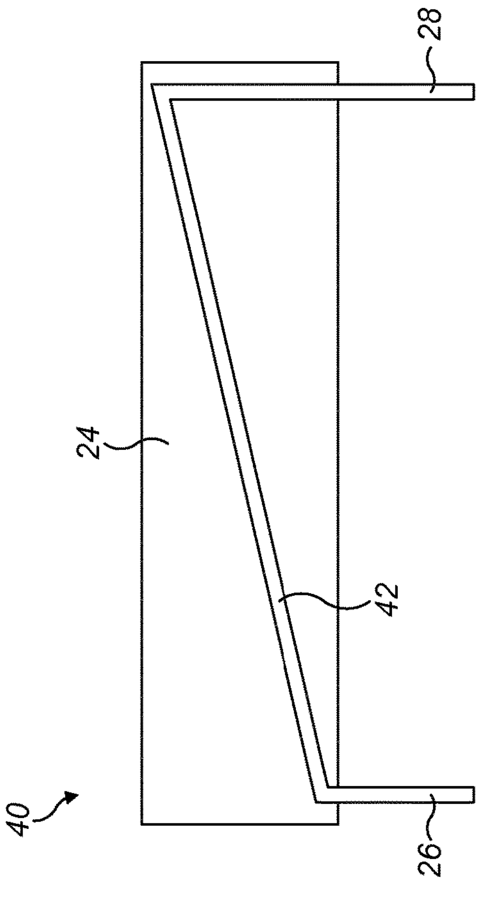
FIG. 12 is a diagrammatic view of a fourth embodiment of an induction coil assembly before it is wound.
Figure 13:
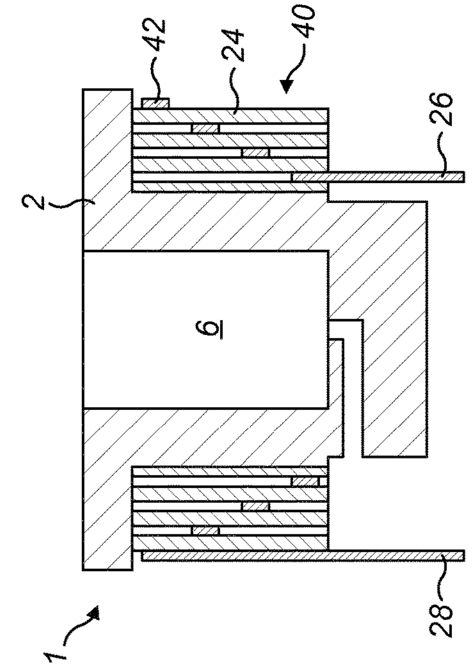
FIG. 13 is a diagrammatic cross-sectional view of an embodiment of an induction heating assembly comprising the induction coil assembly of FIG. 12.

In FIGS. 12 and 13 there is shown diagrammatically an induction coil assembly 40 according to a fourth embodiment of the disclosure. The induction coil assembly 40 is similar to the induction coil assemblies 14, 32 and 36 described with reference to FIGS. 1 to 11 and like parts have been given the same reference sign. Referring to FIG. 12, which shows the induction coil assembly 40 before it is wound, the induction coil assembly 40 comprises a strip 42 of electrically conductive material bonded or fixed to an electrically insulating layer 24. In this embodiment, the axial height of the strip 42 is narrower than the axial height of the strips 22, 34 described above and remains the same along the circumferential direction of the induction coil assembly 40. Referring to FIG. 12, the unwound strip 42 extends from one corner of the unwound electrically insulating layer 24, diagonally across the electrically insulating layer to the opposite corner. This means that after the induction coil assembly 40 is wound into the spiral construction, the strip 42 of electrically conductive material defines an induction coil with a helical construction. The axial position of the induction coil changes along the circumferential direction of the wound induction coil assembly 40 such that it winds around the heating chamber at a continuously increasing distance from the central axis of the induction coil assembly 40 and each turn is offset from the preceding turn in the axial direction. This axial offset between the adjacent turns of the strip 42 is most clearly shown in FIG. 13. It will also be noted from FIG. 13 that the turns of the strip 42 are not positioned in the same cylindrical plane, but rather that because of the overall spiral construction of the induction coil assembly 40, the first connector leg 26 is located at the radially innermost part of the wound strip 42 and the second connector leg 28 is located at the radially outermost part of the wound strip. The turns of the strip 42 are therefore actually positioned in a truncated conical plane and the induction coil defined by the strip specifically has a conical helical construction.

Figure 14:
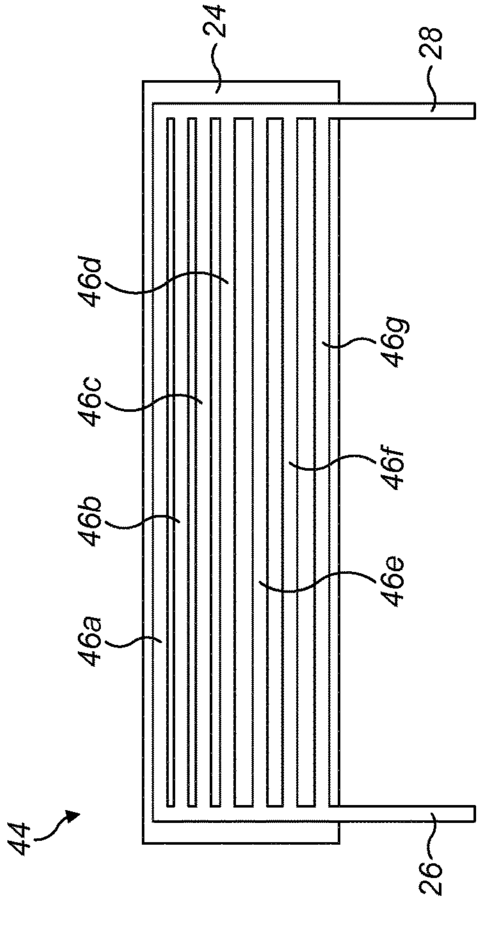
FIG. 14 is a diagrammatic view of a fifth embodiment of an induction coil assembly before it is wound.
Figure 15:
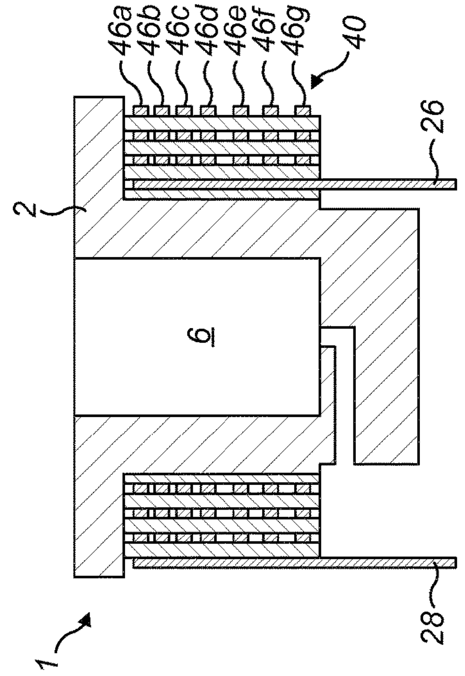
FIG. 15 is a diagrammatic cross-sectional view of an embodiment of an induction heating assembly comprising the induction coil assembly of FIG. 14.

In FIGS. 14 and 15 there is shown diagrammatically an induction coil assembly 44 according to a fifth embodiment of the disclosure. The induction coil assembly 44 is similar to the induction coil assemblies 14, 32, 36 and 40 described with reference to FIGS. 1 to 13 and like parts have been given the same reference sign. Referring to FIG. 14, which shows the induction coil assembly 44 before it is wound, the induction coil assembly 44 comprises a plurality of strips 46*a*, 46*b*, . . . , 46*g* of electrically conductive material that are bonded or fixed to an electrically insulating layer 24. A total of seven strips are shown in FIGS. 14 and 15 but it will be understood that any suitable number may be provided. The strips 46*a*, 46*b*, . . . , 46*g* extend in parallel along the electrically conductive layer 24 between first and second connector legs 26, 28. Each strip 46 of electrically conductive material defines an induction coil that has a spiral construction. In particular, the axial position of each strip 46*a*, 46*b*, . . . , 46*g* does not change along the circumferential direction of the induction coil assembly 44 such that each strip winds around the heating chamber 6 at a continuously increasing distance from the central axis of the induction coil assembly 44. Each turn of each strip 46*a*, 46*b*, . . . , 46*g* overlaps fully with the preceding turn to form the spiral construction.

The strips 46*a*, 46*b*, . . . , 46*g* are spaced apart along the width of the unwound electrically insulating layer 24 (i.e., in the axial direction of the wound induction coil assembly 44)

in an uneven manner. In particular, the spacing between each adjacent pair of strips 46*a*, 46*b*, . . . , 46*g* gradually changes along the width of the unwound electrically insulating layer 24. Referring to FIG. 15, the strips 46*a*, 46*b* that are located near the top 12 of the support 2 are closer together than the strips 46*f*, 46*g* that are located near the bottom 8 of the support. This means that the induction coils defined by the strips 46*a*, 46*b*, . . . , 46*g* are concentrated at the top of the induction coil assembly 44. The induction coils may also be concentrated at the middle or the base of the induction coil assembly in an alternative embodiment. The uneven distribution of induction coils in the axial direction of the induction coil assembly 44 may provide a desired electromagnetic field distribution within the heating chamber 6. In an alternative embodiment, the spacing between each adjacent pair of strips may be substantially the same so that there is a substantially even distribution of induction coils in the axial direction of the induction coil assembly 44.

Figure 17:
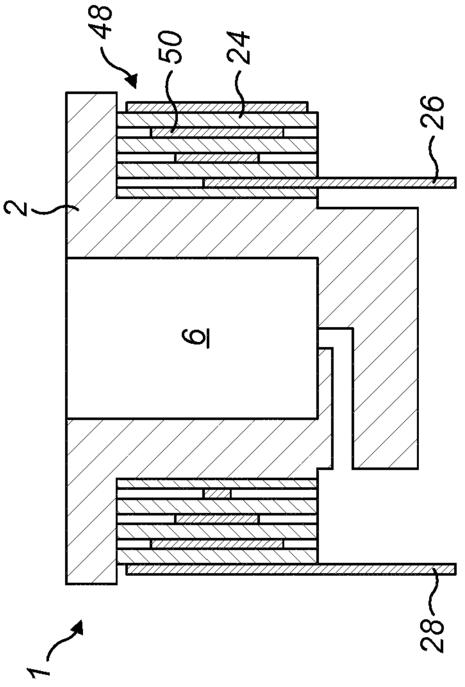
FIG. 17 is a diagrammatic cross-sectional view of an embodiment of an induction heating assembly comprising the induction coil assembly of FIG. 16.
Figure 16:
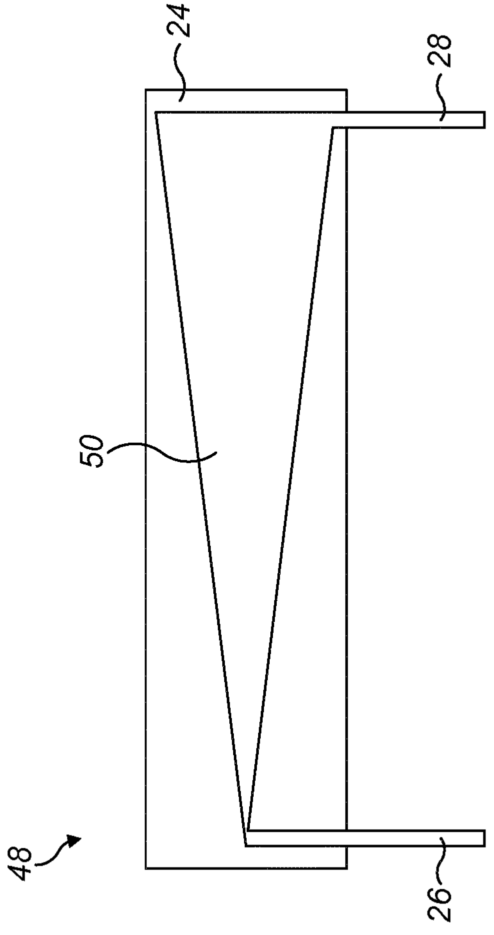
FIG. 16 is a diagrammatic view of a sixth embodiment of an induction coil assembly before it is wound.

In FIGS. 16 and 17 there is shown diagrammatically an induction coil assembly 48 according to a sixth embodiment of the disclosure. The induction coil assembly 48 is similar to the induction coil assemblies 14, 32, 36, 40 and 44 described with reference to FIGS. 1 to 15 and like parts have been given the same reference sign. Referring to FIG. 16, which shows the induction coil assembly 48 before it is wound, the induction coil assembly 48 comprises a strip 50 of electrically conductive material bonded or fixed to an electrically insulating layer 24. In this embodiment, the strip 50 has an axial height that changes or varies along the circumferential direction of the wound induction coil assembly 48. Referring to FIG. 16, the unwound strip 50 has a generally triangular shape. This means that after the induction coil assembly 48 is wound into the spiral construction, the strip 50 of electrically conductive material defines an induction coil whose axial height varies along the circumferential direction of the induction coil assembly. Such an induction coil may provide a desired electromagnetic field distribution within the heating chamber 6. The strip 50 winds around the heating chamber 6 at a continuously increasing distance from the central axis of the induction coil assembly 48 and each turn overlaps with the preceding turn to form the spiral construction.

Figure 18:
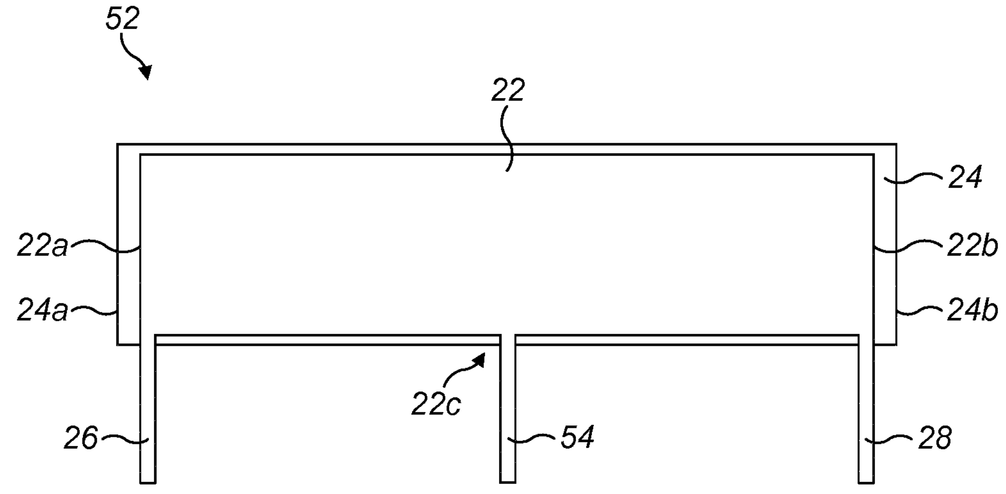
FIG. 18 is a diagrammatic cross-sectional view of a seventh embodiment of an induction coil assembly before it is wound.

In FIG. 18 there is shown diagrammatically an induction coil assembly 52 according to a seventh embodiment of the disclosure. The induction coil assembly 52 is similar to the induction coil assembly 14 described with reference to FIG. 5 and like parts have been given the same reference sign. Referring to FIG. 18, which shows the induction coil assembly 52 before it is wound, a third connector leg 54 projects from a centre part 22*c* of the strip 22 of electrically conductive material. The third connector leg 54 is therefore positioned between the first connector leg 26 and the second connector leg 28 along the length of the strip 22. It will be readily understood that any of the other induction coil assemblies described above may also include a third connector leg in a similar manner.

Figure 19:
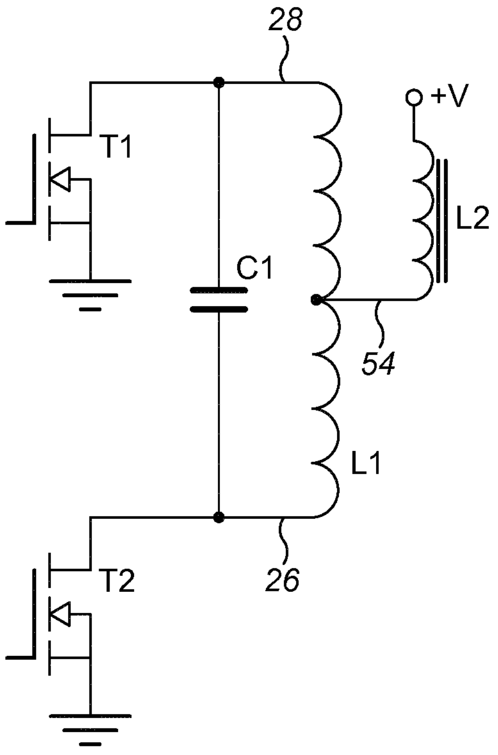
FIG. 19 is a circuit diagram of part of an electronic circuit of an aerosol generating device.

FIG. 19 is a circuit diagram of part of an electronic circuit of the aerosol generating device. The electronic circuit is electrically connected to the induction coil assembly 52 shown in FIG. 18. The first and second connector legs 26, 28 are electrically connected to power semiconductor switches T1, T2 of the electronic circuit. The power semiconductor switches T1, T2 may be controlled to turn on and off at high frequency to alternately connect each of the first and second connector legs 26, 28 to ground so that current flows back and forth through the induction coil assembly 52 in both directions, and in particular through the strip 22 of electrically conductive material that defines the induction coil and which is represented in the circuit diagram of FIG. 19 by the inductor L1. Turning the power semiconductor switches T1, T2 on and off will therefore create an alternating electromagnetic field for heating one or more susceptors in the aerosol generating article by inducing eddy current and/or magnetic hysteresis losses in the susceptors. The power semiconductor switches T1, T2 may be MOSFETs, for example. A capacitor C1 is electrically connected to the first and second connector legs 26, 28 in parallel with the inductor L1. The inductor L1 and the capacitor C1 together define a parallel LC circuit. The third connector leg 54 of the induction coil assembly 52 acts as a so-called “centre tap” and is electrically connected to a power source by means of a low-pass filter which is represented by a choke coil L2. The choke coil L2 may limit the current in the inductor L1 to acceptable levels and may help to optimise its frequency characteristics.

Although exemplary embodiments have been described in the preceding paragraphs, it should be understood that various modifications may be made to those embodiments without departing from the scope of the appended claims. Thus, the breadth and scope of the claims should not be limited to the above-described exemplary embodiments.

Unless the context clearly requires otherwise, throughout the description and the claims, the words “comprise”, “comprising”, and the like, are to be construed in an inclusive as opposed to an exclusive or exhaustive sense; that is to say, in the sense of “including, but not limited to”.

The invention claimed is:

1. An induction heating assembly for an aerosol generating device, the induction heating assembly comprising a heating chamber for receiving, in use, an aerosol generating article inside the heating chamber, and an induction coil assembly substantially surrounding the heating chamber, the induction coil assembly comprising an electrically insulating layer and an electrically conductive track, wherein the induction coil assembly has a substantially tubular construction and wherein at least part of the induction coil assembly overlaps with another part of the induction coil assembly in an axial direction, wherein the induction coil assembly has a spiral construction, wherein the entire induction coil assembly winds around the heating chamber at a continuously increasing distance from a central axis of the induction coil assembly such that the electrically insulating layer is interposed between adjacent turns of the electrically conductive track.

2. The induction heating assembly according to claim 1, further comprising a connector leg electrically connected to an end of the electrically conductive track and which projects from the electrically conductive track.

3. The induction heating assembly according to claim 2, further comprising a base that supports an axial end of the induction coil assembly.

4. The induction heating assembly according to claim 3, wherein the base comprises a slot or opening for receiving the connector leg.

5. The induction heating assembly according to claim 1, further comprising an electromagnetic shield that substantially surrounds the induction coil assembly.

6. The induction heating assembly according to claim 5, wherein there is a gap between the induction coil assembly and the electromagnetic shield.

7. An induction heating assembly for an aerosol generating device, the induction heating assembly comprising a heating chamber for receiving, in use, an aerosol generating article inside the heating chamber, and an induction coil assembly substantially surrounding the heating chamber, the induction coil assembly comprising an electrically conductive track, wherein at least part of the electrically conductive track overlaps with another part of the electrically conductive track in an axial direction, wherein the induction coil assembly comprises an electrically insulating layer that is located at least between the overlapping parts of the electrically conductive track, wherein the entire induction coil assembly winds around the heating chamber at a continuously increasing distance from a central axis of the induction coil assembly such that the electrically insulating layer is interposed between adjacent turns of the electrically conductive track.

8. A method of manufacturing an induction heating assembly for an aerosol generating device, the induction heating assembly comprising a heating chamber for receiving, in use, an aerosol generating article inside the heating chamber, and an induction coil assembly substantially surrounding the heating chamber, the method comprising the steps of:

forming or positioning an induction coil assembly substantially around the heating chamber, the induction coil assembly comprising an electrically insulating layer and an electrically conductive track, wherein the induction coil assembly has a substantially tubular construction and wherein at least part of the induction coil assembly overlaps with another part of the induction coil assembly in an axial direction, wherein the step of forming or positioning the induction coil assembly comprises winding the electrically insulating layer and the electrically conductive track around the heating chamber at a continuously increasing distance from a central axis of the induction coil assembly, wherein the induction coil assembly has a spiral construction such that the electrically insulating layer is interposed between adjacent turns of the electrically conductive track.

9. The method according to claim 8, wherein the heating chamber is defined by one or more walls of a support, wherein the electrically insulating layer and/or the electrically conductive track is/are wound around the one or more walls, and wherein the support comprises at least one flange that extends outwardly from the one or more walls and guides the electrically insulating layer and/or the electrically conductive track during the winding process.

10. The method according to claim 8, wherein the induction coil assembly comprises a connector leg electrically connected to an end of the electrically conductive track and wherein the step of forming or positioning the induction coil assembly is carried out so that the connector leg projects from the electrically conductive track.

11. The method according to claim 10, further comprising the step of electrically connecting the connector leg to a connector of a body assembly of an aerosol generating device.

12. The method according to claim 8, further comprising the step of forming or positioning an electromagnetic shield substantially around the induction coil assembly.

13. The method according to claim 8, further comprising forming the heating chamber prior to the step of forming or positioning the induction coil assembly.

* * * * *